United States Patent
Schulte et al.

(10) Patent No.: US 11,290,004 B2
(45) Date of Patent: Mar. 29, 2022

(54) CURRENT SWITCH CONTROL MEANS

(71) Applicant: Phoenix Contact GmbH & Co. KG, Blomberg (DE)

(72) Inventors: Thorsten Schulte, Salzkotten-Holsen (DE); Raphael Knoke, Altenbeken (DE); Sergej Migulkin, Paderborn (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 16/965,094

(22) PCT Filed: Jan. 31, 2019

(86) PCT No.: PCT/EP2019/052395
§ 371 (c)(1),
(2) Date: Jul. 27, 2020

(87) PCT Pub. No.: WO2019/158367
PCT Pub. Date: Aug. 22, 2019

(65) Prior Publication Data
US 2021/0119529 A1    Apr. 22, 2021

(30) Foreign Application Priority Data

Feb. 14, 2018  (BE) .................................. 2018/5091

(51) Int. Cl.
*H02M 1/42*    (2007.01)
*H02M 5/04*    (2006.01)
*H02M 1/00*    (2006.01)

(52) U.S. Cl.
CPC ........... *H02M 1/4208* (2013.01); *H02M 5/04* (2013.01); *H02M 1/0009* (2021.05)

(58) Field of Classification Search
CPC ...... Y02B 70/10; H02M 5/04; H02M 1/0025; H02M 1/4225; H02M 1/14; H02M 1/15; H02M 1/4208; H02M 1/0009
See application file for complete search history.

(56) References Cited

U.S. PATENT DOCUMENTS

| | | | |
|---|---|---|---|
| 10,989,775 B2* | 4/2021 | Kawajiri | G01R 33/3852 |
| 2009/0091304 A1* | 4/2009 | Yang | H02M 1/4225 323/242 |
| 2009/0303751 A1* | 12/2009 | Usui | H02M 3/1584 363/15 |
| 2013/0258731 A1* | 10/2013 | Xu | H02M 3/156 363/78 |
| 2013/0285627 A1 | 10/2013 | Chae et al. | |

(Continued)

*Primary Examiner* — Jared Fureman
*Assistant Examiner* — Esayas G Yeshaw
(74) *Attorney, Agent, or Firm* — Holland & Hart LLP

(57) ABSTRACT

A current switch control system includes a first controllable switch, a first current switching controller, a second controllable switch, a second current switching controller, and a reference value controller. Each current switching controller generates a pulse width modulated switching signal to change the state of one of the respective controllable switches based on a current reference value and a current measured value corresponding to current flow through the respective controllable switch. The reference value controller changes the current reference values used by the current switching controllers based on the pulse width modulated switching signals for the controllable switches.

16 Claims, 4 Drawing Sheets

(56) References Cited

U.S. PATENT DOCUMENTS

| | | | |
|---|---|---|---|
| 2014/0169049 A1 | 6/2014 | Chandrasekaran | |
| 2014/0239854 A1* | 8/2014 | Suzuki | H02P 5/68 |
| | | | 318/35 |
| 2016/0352269 A1* | 12/2016 | Takahashi | H02P 6/28 |
| 2017/0310105 A1* | 10/2017 | Shen | G05B 15/02 |
| 2019/0159310 A1* | 5/2019 | Yang | H05B 45/3725 |
| 2020/0343816 A1* | 10/2020 | Wu | H02M 3/1584 |

* cited by examiner

CURRENT SWITCH CONTROL MEANS

CROSS-REFERENCE TO RELATED APPLICATIONS

The present application is a 371 national phase of International Patent Application No. PCT/EP2019/052395 by Schulte et al., entitled "CURRENT SWITCH CONTROL MEANS," filed Jan. 31, 2019; and claims the benefit of Belgium Patent Application No. BE2018/5091 by Schulte et al. entitled "STROMSCHALTERSTEUERUNG," filed on Feb. 14, 2018, each of which is assigned to the assignee hereof which is hereby incorporated by reference in their entirety.

BACKGROUND

The present disclosure relates to a current switch control system for switching time control of controllable current switches.

Current switch control systems are used in particular to control current signals of a plurality of interleaved converters in order to generate a sum signal, in particular a direct voltage signal, from individual current signals by alternately switching the interleaved converters. In order to prevent, in particular, high-frequency AC voltage components in the sum signal, it may be necessary to switch a current flow from the respective interleaved converter to an electrical consumer as a function of an output current strength of the respective interleaved converter. Usually, at least two interleaved converters are switched out of phase by half a switching period in order to generate a sum signal from two half-waves with the same polarity.

Since the respective switching time can be determined depending on the respective output current, a precise current measurement may be necessary. However, precise current measurement can be disadvantageously associated with increased manufacturing costs of the current switch controller. A switching point in time determined from a faulty current measurement can deviate from the ideal switching point in time, so that the sum signal can have AC components in a disadvantageous manner. In particular, an AC current can be transmitted that exceeds a predetermined frequency-dependent current limit.

SUMMARY

It is the object of the present disclosure to provide a current switch control system which, with a cost and/or component-reduced current measuring device, realizes a precise switching of current signals to a sum signal with reduced AC voltage components.

This object is solved by the features of the independent claim. Advantageous examples are the subject matter of the dependent claims, the description and the accompanying figures.

The present disclosure is based of the finding that the above object can be solved by a current switch control system which, in addition to a current switching controller, has a reference value controller for each controllable current switch. The reference value controller is configured to compensate for defective current measurement of current measuring devices, which measure the current flow through the respective controllable switch, by changing a current reference value. The respective current switching controller is provided with the adapted current reference value and the respectively measured current measured value as input parameters, the respective current switching controller generating a switching signal for the respective controllable switch. The reference value controller uses a difference in the switching signals of the respective current switching controllers to regulate the current reference value.

According to a first aspect, the disclosure relates to a current switch control system for switching time control of controllable switches. The current switch control system comprises a first controllable switch, which has a first switched state and a second switched state, and a first current switching controller for switching control of the first controllable switch. The first current switching controller is configured to generate a first pulse-width-modulated switching signal for controlling the first controllable switch on the basis of a current reference value and a first current measured value of a current flow through the first controllable switch that is detected by a further current measuring device. Furthermore, the first controllable switch is configured to change from the first switched state into the second switched state in accordance with the second pulse-width-modulated switching signal.

The current switch control system further comprises a second controllable switch which has a third switched state and a fourth switched state, and a second current switching controller for switching control of the second controllable switch. The second current switching controller is configured to generate a second pulse-width-modulated switching signal for controlling the second controllable switch on the basis of a current reference value and a second current measured value of a current flow through the second controllable switch that is measured by a current measuring device. The second controllable switch is also configured to change from the third switched state to the fourth switched state in accordance with the second pulse-width-modulated switching signal.

Furthermore, the current switch control system comprises a reference value controller, which is configured to change the current reference value separately for the first current switching controller and the second current switching controller on the basis of the first pulse-width-modulated switching signal and the second pulse-width-modulated switching signal.

The current switch control system can be used especially for interleaved current factor correction circuits (PFC) for controlling an output signal. For these circuits it may be necessary not to exceed limit values with regard to the AC components of the output signal. The limit values can be defined, for example, in a device specification, and operation of the circuit can be linked to compliance with the device specification. In particular, it may be necessary not to exceed the limit curve EMC class A according to DNV-GL Class Guideline due to the signal level of the output signal.

An assumed AC component of the output signal can be reduced if the controllable switches experience the same switching time. An accuracy of the switching time can be proportional to a measurement error of the current measuring devices, so that with an increasing deviation of the respective current measured value from the actual current strength of the current flowing through the respective switch, a deviation from an ideal switching time can increase. Accordingly, the switching times of the controllable switches can deviate from an ideally phase-shifted switching on, so that the current that flows through the first controllable switch is superimposed on the further current that flows through the second controllable switch. As a result, signal components can be generated which have a higher frequency than the output signal.

A measurement inaccuracy of the current measuring device, which is formed by a current measuring resistor, can be greater compared to other current measuring devices, with a deviation of the current measuring value provided by the current measuring device being compensated by means of the reference value controller, so that the switching times of the controllable switches can be synchronous. The reference value controller can in particular be an additional control stage, which controls the input signals of the current switching controller and forms a two-stage control unit with the respective current switching controller.

With the reference value controller connected upstream of the current switching controllers, it is advantageously possible to omit a precise current measurement and to compensate for a faulty current measurement value by controlling the current reference value. In this way, systematic errors and/or constant magnitude errors of the current measured value can be compensated in particular.

Advantageously, a combination of reference value controller and current measuring devices with higher tolerance ranges can be produced more cheaply than a current measuring device with comparatively smaller tolerance ranges, so that the current switch control system can be produced more cheaply. In particular, component costs for the current switch control system can be reduced if the reference value controller can be implemented as part of a software program on a digital signal processor, the software program also comprising the first current switching controller and the second current switching controller.

The controllable switches can be configured to switch between the respective switched states in accordance with the pulse-width-modulated switching signal. In the first switched state, the first controllable switch can be configured to conduct an electrical current through the first controllable switch, and in the second switched state the first controllable switch can be configured to prevent current conduction through the first controllable switch. Correspondingly, the second controllable switch can be configured to conduct an electrical current through the second controllable switch in the third switched state and to prevent current conduction through the second controllable switch in the fourth switched state.

In one example, the first current switching controller has a first proportional-integrating-derivative (PID) controller and is configured to process the first current measured value on the basis of the current reference value, in particular to subtract the first current measured value from the current reference value and to derive this difference value as a first input signal to provide it to the first PID controller. This achieves the advantage that the first current switching controller can use the first PID controller to counteract a difference between the current measured value and the reference value in order to reduce the difference. The smaller the difference, the smaller the deviation of the switching time of the first controllable switch from a target switching time, which can be coupled to the reference value.

In one example, the first PID controller is configured to provide a first switching time control signal on the basis of the first input signal. The PID controller can in particular form a continuously modulated control loop, which detects a deviation of the respective current measured value from the reference value and to generate a correction value in the form of a switching time control signal. The controller can accumulate the deviation over a period of time and detects an increase in the time course of the deviation and/or can comprise a proportional control signal component. In particular, the PHD controller for the proportional, integrative and/or derivative control component can have a setting parameter with which the respective proportion of the control component in the switching time control signal can be set.

In one example, the first current switching controller has a first signal generator, which is configured to convert the first switching time control signal into the first pulse-width-modulated switching signal for controlling the first controllable current switch. The signal generator can in particular be configured to convert the switching time control signal, which can be a discrete digital signal, into a binary pulse-width-modulated signal, with which a length of switch-on phases of the first controllable current switch can be changed in relation to switch-off phases of the first controllable current switch. Furthermore, the signal generator can be configured to change a switching frequency of the first current switch.

In one example, the second current switching controller has a second proportional-integral-derivative (PID) controller and is configured to process the second current measured value on the basis of the current reference value, in particular to subtract the second current measured value from the current reference value and to provide it as a second input signal to the second PID Controller.

In one example, the second PID controller is configured to provide a second switching time control signal on the basis of the second input signal.

In one example, the second current switching controller has a second signal generator which is configured to convert the second switching time control signal into the first pulse-width-modulated switching signal for actuating the second controllable current switch.

In one example, the reference value controller is configured to generate a reference value control signal and to process it with the current reference value, in particular to add the reference value control signal to the current reference value and/or to subtract it from the current reference value.

In particular, the first current switching controller can be provided with a sum signal comprising the reference value control signal and the current reference value as an input signal, and the second current switching controller can be provided with a difference signal comprising the current reference value minus the reference value control signal. As a result, the reference value control signal can be used to reduce a temporal overlap of the switch-on time of the first controllable switch with the switch-on time of the second controllable switch. The current switching controllers can be provided with an adapted current reference value as an input signal by means of the reference value controller, wherein the respective adapted current reference value can deviate from the respective other adapted current reference value by twice the amount of the reference value control signal. Accordingly, the switching times of the controllable switches can be adjusted in the opposite direction at the same time. For example, a switching time of the first controllable switch can be delayed and a switching time of the second controllable switch can be brought forward.

In one example, the reference value controller is configured to generate a difference value between the first pulse-width-modulated switching signal and the second pulse-width-modulated switching signal.

In one example, the reference value controller has a further proportional-integrating-derivative (PID) controller and is configured to provide the further PID controller with the difference value as an input signal, and the PID controller is configured to generate the reference value control signal.

The reference value controller can be configured to control the current switching controller in such a way that a difference between the first switching time control signal and the second switching time control signal is reduced, in particular minimized.

In one example, the current switch control system comprises a first current measuring device, which is configured to detect the first current measured value of a current flowing through the first controllable switch, and a second current measuring device, which is configured to detect the second current measured value of a current flowing through the second controllable switch, wherein the first current measuring device and/or the second current measuring device each comprise a current measuring resistor.

The current measuring devices can each be connected downstream of an inductance of a interleaved converter in order to detect a current intensity of a current flow through the respective inductance. The current measuring devices can, for example, be current converters, which are arranged in a switching path of the respective controllable current switch. The current controllers can independently of one another control a current flow from the respective upstream interleaved converter to an electrical consumer.

In one example, the first current switching controller, the second current switching controller and/or the reference value controller are part of a digital signal processor (DSP) and/or wherein the first current switching controller, the second current switching controller and/or the reference value controller are at least partially implemented as a software program which is executable by the digital signal processor.

This can realize the advantage that the manufacturing costs of the current switch control system with the reference value controller do not exceed the manufacturing costs of a current switch control system without a reference value controller or the additional amount is smaller than a manufacturing cost difference when using a precise current measuring device compared to less precise current measuring devices. The manufacturing costs for a current switch control system can be lower, the more current measurements can be carried out using a less precise current measuring device, in particular with a current measuring resistor, and can be compensated by using the reference value controller. The digital signal processor can furthermore have an internal periphery which is configured to amplify a current measurement signal, in particular the current measurement values.

In one example, the first controllable switch and the second controllable switch are arranged electrically in parallel with one another, with a control subsystem comprising the first current switching controller, the second current switching controller and the reference value controller being configured to apply the first pulse-width-modulated switching signal to the first controllable switch and the to apply the second pulse-width-modulated switching signal to the second controllable switch.

In one example, the control subsystem is configured to control the respective switching time of the controllable switches, a current and/or a current frequency of a current sum, which is formed as a sum signal of the current flowing through the first controllable switch and the current flowing through the second controllable switch.

In one example, the reference value controller is configured to compensate for a deviation of the first current measurement value from the current actually flowing through the first controllable switch and/or a deviation of the second current measurement value from the current actually flowing through the second controllable switch by controlling the current reference value in order to dampen high-frequency current vibrations with a frequency in the range from 20 kHz to 30 MHz.

In one example, the first pulse-width-modulated switching signal is phase-shifted by half a switching period in relation to the second pulse-width-modulated switching signal in order to compensate the sum of the current through the first controllable switch and the current through the second controllable switch against one another to form a direct current signal. Half the switching period can in particular deviate from a half period of the input signal, for example a main sinusoidal voltage. Accordingly, a switching frequency of the controllable switches can in particular be greater than a frequency of the input signal in order to achieve efficient control of the output signal.

BRIEF DESCRIPTION OF THE DRAWINGS

Examples of the principles of the present disclosure are explained with reference to the attached figures, of which.

DETAILED DESCRIPTION

Figure 1:
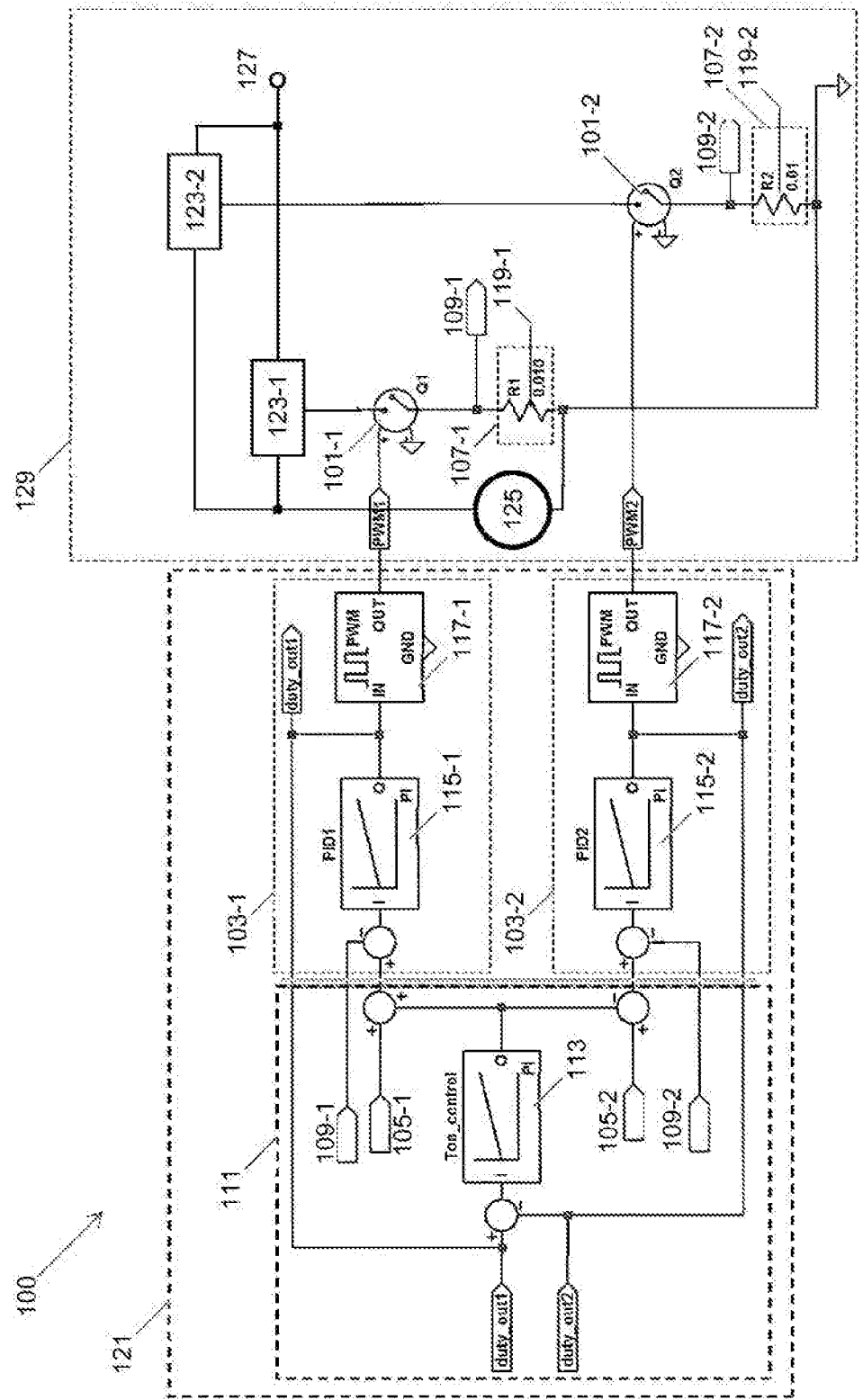
FIG. 1 shows a current switch control system in one example.

FIG. 1 shows a schematic illustration of a current switch control system 100 for switching time control of controllable switches 101-1, 101-2. The current switch control system 100 comprises a first controllable switch 101-1, which has a first switched state and a second switched state, and a first current switching controller 103-1 for switching control of the first controllable switch 101-1. The first current switching controller 103-1 is configured, on the basis of a current reference value 105-1 and a first current measurement value 109-1 of a current flow through the first controllable switch 101-1, detected by a first current measuring device 107-1, to generate a first pulse-width-modulated switching signal PWM1 for controlling the first controllable switch 101-1. Furthermore, the first controllable switch 101-1 is configured to change from the first switched state to the second switched state in accordance with the first pulse-width-modulated switching signal PWM1.

The current switch control system 100 further comprises a second controllable switch 101-2, which has a third switched state and a fourth switched state, and a second current switching controller 103-2 for switching control of the second controllable switch 101-2. The second current switching controller 103-2 is configured, on the basis of a current reference value 105-2 and a second current measurement value 109-2 of a current flow through the second controllable switch 101-2, detected by a further current measuring device 107-2, to generate a second pulse-width-modulated switching signal PWM2 for controlling the second controllable switch 101-2, wherein the second controllable switch 101-2 is configured to change from the third switched state to the fourth switched state in accordance with the second pulse-width-modulated switching signal PWM2.

The current switch control system further comprises a reference value controller 111, which is configured to change the current reference value 105-1, 105-2 separately for the first current switching controller 103-1 and the second current switching controller 103-2 on the basis of the first pulse-width-modulated switching signal PWM1 and the second pulse-width-modulated switching signal PWM2.

The first current switching controller 103-1 has a first proportional-integrating-derivative PID controller 115-1 and is configured to subtract the first current measurement value 109-1 from the current reference value 105-1 and to provide this difference value as a first input signal to the first PID controller 115-1. The first current switching controller 103-1 also has a first signal generator 117-1, which is configured to convert the first switching time control signal duty_out1 into the first pulse-width-modulated switching signal PWM1 for controlling the first controllable current switch 101-1.

The second current switching controller 103-2 has a second proportional-integral-derivative PID controller 115-2 and is configured to process the second current measurement value 109-2 on the basis of the current reference value 105-2, in particular to subtract the second current measurement value 109-2 from the current reference value 105-2 and provide it as a second input signal to the second PID controller 115-2. The second current switching controller 103-2 also has a second signal generator 117-2, which is configured to convert the second switching time control signal duty_out2 into the second pulse-width-modulated switching signal PWM2 for controlling the second controllable current switch 101-2.

The reference value controller 111 has a further proportional-integrating-derivative PID controller 113 and is configured to provide the further PID controller 113 with the difference value as an input signal, and the PID controller 113 is configured to generate the reference value control signal.

The current switch control system 100 further comprises the first current measuring device 107-1, which is configured to detect the first current measured value 109-1 of a current flowing through the first controllable switch 101-1, and the second current measuring device 107-2, which is configured, to detect the second current measured value 109-2 of a current flowing through the second controllable switch 101-2. The first current measuring device 107-1 and the second current measuring device 107-2 each comprise a current measuring resistor 119-1, 119-2.

The first controllable switch 101-1 and the second controllable switch 101-2 are arranged electrically in parallel to one another, and a control subsystem 121 comprising the first current switching controller 103-1, the second current switching controller 103-2 and the reference value controller 111, is configured to apply the first pulse width modulated switching signal PWM1 to the first controllable switch 101-1 and to apply the second pulse width modulated switching signal PWM2 to the second controllable switch 101-2.

The first controllable switch 101-1 is connected downstream of a first interleaved converter 123-1 and the second controllable switch 101-2 is connected downstream of a second interleaved converter 123-2. A voltage source 125 is connected upstream of the interleaved converters 123-1, 123-2. The voltage source 125 is in particular an alternating current source with a rectifier circuit. An output signal of an interleaved current factor correction circuit 129 can be tapped at a signal output 127.

The reference value controller 111 is configured to compensate for a deviation of the first current measured value 109-1 from the current actually flowing through the first controllable switch 101-1 and/or for a deviation of the second current measured value 109-2 from the current actually flowing through the second controllable switch 101-2 by controlling the current reference value 105-1, 105-2 in order to dampen high-frequency current vibrations with a frequency in the range from 20 kHz to 30 MHz.

Figure 2:
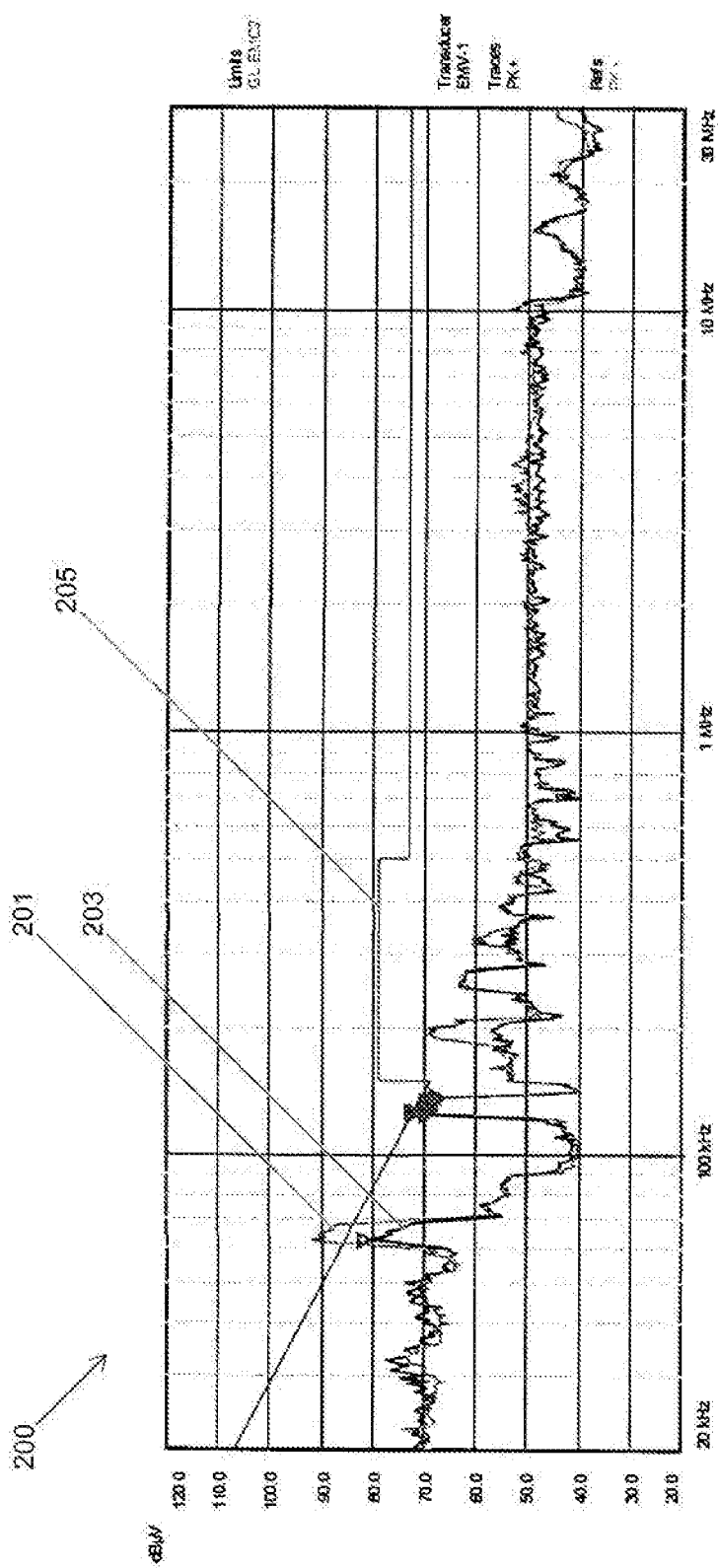
FIG. 2 shows an output signal level of an interleaved current factor correction circuit in one example.

FIG. 2 shows a comparison representation 200 of an output signal 201 of an interleaved current factor correction circuit and a further output signal 203 of a further interleaved current factor correction circuit according to the example shown in FIG. 1. The controllable switches of the further interleaved current factor correction circuit are controlled by means of a current switch control system in accordance with the example shown in FIG. 1, which in particular comprises a reference value controller for controlling a current reference value. A current limit characteristic curve 205 is also shown, which defines frequency-dependent maximum current limit values or the output signals 201, 203.

In particular in the frequency ranges from 60 kHz to 70 kHz and 120 kHz to 130 kHz, the output signal 201 exceeds the current limit values defined by means of the current limit characteristic 205. On the other hand, the output signal 203 comprises no exceedances of the current limit values in the frequency range under consideration.

Figure 3:
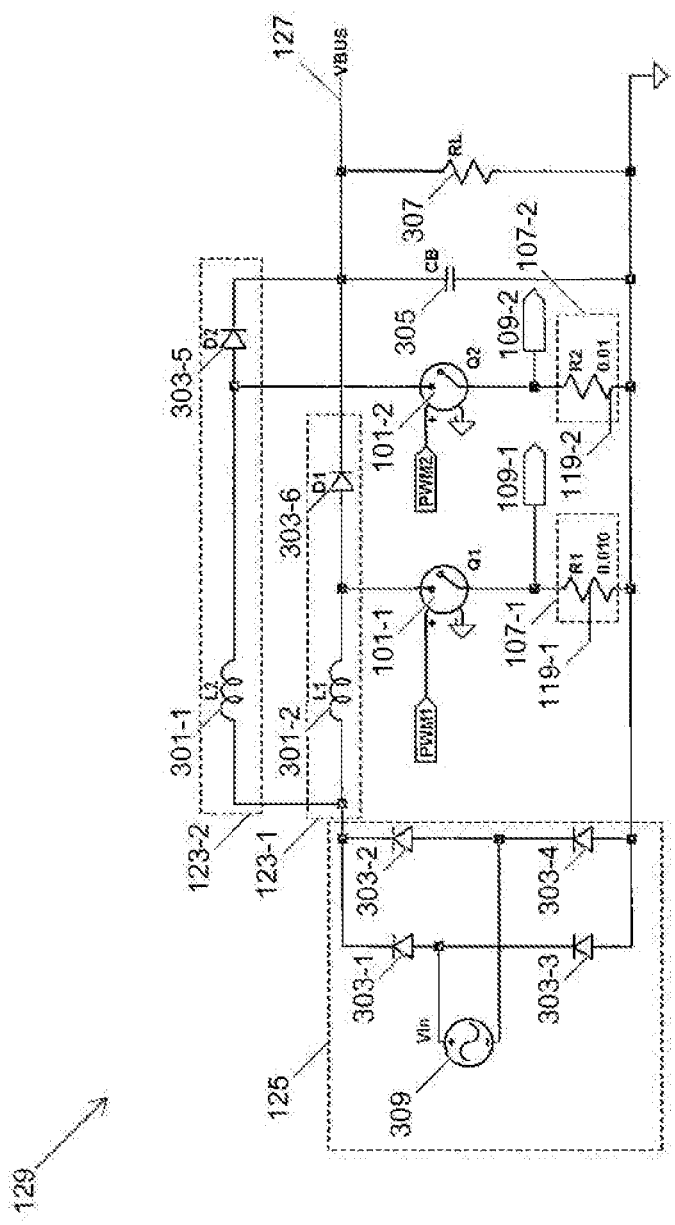
FIG. 3 shows a interleaved current factor correction circuit in one example.

FIG. 3 shows a schematic illustration of the interleaved current factor correction circuit 129 according to the example shown in FIG. 1.

The voltage source 125 comprises an AC voltage generator 309 and a rectifier circuit, which is formed by a bridge rectifier. The bridge rectifier comprises an arrangement of four diodes 303-1 to 3034, which are configured to convert an AC voltage signal of the AC voltage generator 309 into a DC voltage signal and to provide it to the interleaved converters 123-1, 123-2.

The interleaved converters 123-1, 123-2 are connected downstream of the bridge rectifier and are connected in parallel to one another. Furthermore, the interleaved converters 123-1, 123-2 each have an inductance 301-1, 301-2, which is followed by a diode 303-5, 303-6, respectively. Furthermore, the first controllable switch 101-1 is connected upstream of the inductance 301-1 and the second controllable switch 101-2 is connected upstream of the inductance 301-2. The first current measurement value 109-1 can be tapped between the first controllable switch 101-1 and the first current measurement resistor 119-1 and the second current measurement value 109-1 can be tapped between the second controllable switch 101-2 and the second current measurement resistor 119-1.

The interleaved converters 123-1, 123-2 are followed by a capacitor 305 and a resistor 307, which are each connected in parallel to the voltage source 125, the capacitor 305 being connected in parallel to the resistor 307. An output signal of the interleaved current factor correction circuit 129 is provided at the signal output 127.

The first controllable switch 101-1 is provided with the first pulse-width-modulated switching signal PWM1 from the current switch control according to the example shown in FIG. 1, and the second controllable switch 101-2 is provided with the second pulse-width-modulated switching signal PWM2 from the current switch control according to the example shown in FIG. 1.

Figure 4A:
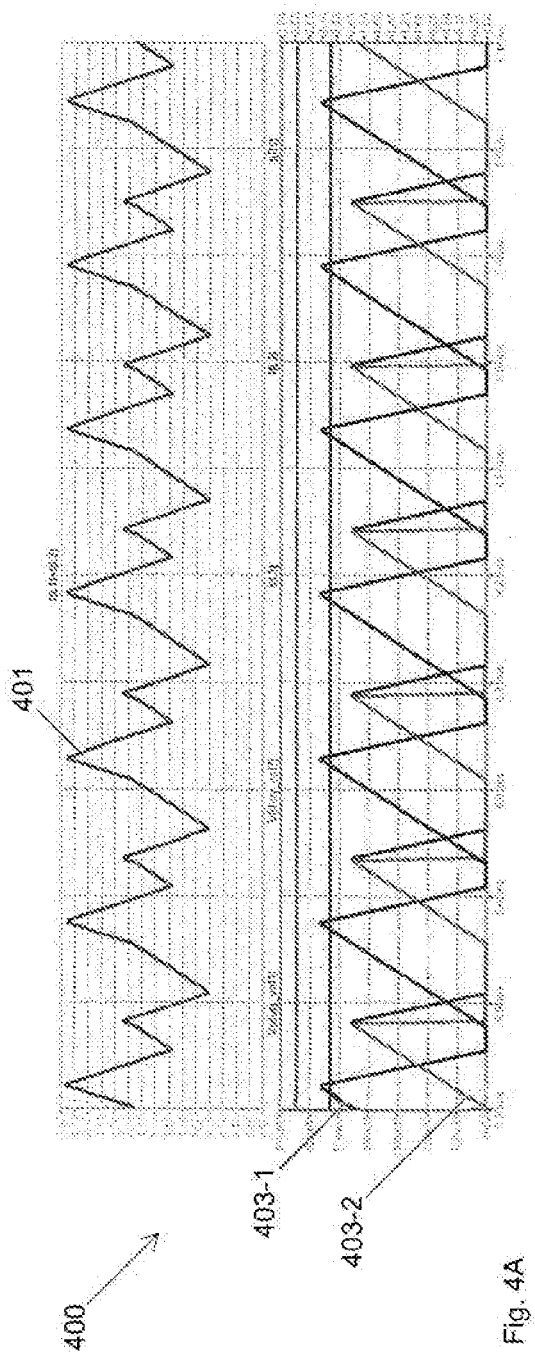
FIG. 4A, 4B are signal representations of an output signal of an interleaved current factor correction circuit in one example.

FIG. 4A shows a temporal waveform representation 400 of the output signal 201 according to the example shown in FIG. 2, wherein both the sum signal 401 and the individual component signals 403-1, 403-2 of the respective interleaved converters are shown. The component signals 403-1, 403-2 are superimposed in such a way that the sum signal 401 forms a sum of two phase-shifted sawtooth signals, which in particular have different maximum amplitudes, so that interference currents result above a nominal frequency of the sum signal 401 or output signal. The time course of the component signals 403-1, 403-2 is determined in each case by the controllable switches according to the example shown in FIG. 1. The output signal 201 can be generated in particular in the case of an asynchronous connection of the controllable switches to one another.

Figure 4B:
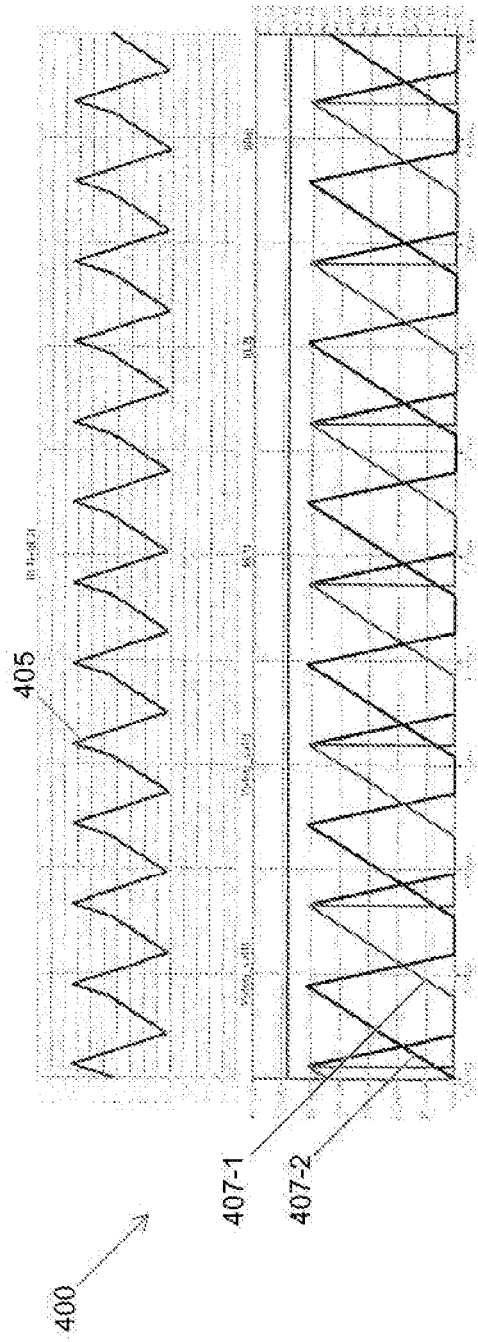

FIG. 4B shows a time-waveform representation 400 of the further output signal according to the example shown in FIG. 2, wherein both the sum signal 405 and the individual component signals 407-1, 407-2 of the respective interleaved converters are shown. The component signals 403-1, 403-2 are superimposed such that the sum signal 405 forms a sum of two phase-shifted sawtooth signals, which in particular have the same maximum amplitudes, so that interference currents above a nominal frequency of the sum signal 405 or the further output signal are prevented. The temporal course of the component signals 407-1, 407-2 is determined in each case by the controllable switches according to the example shown in FIG. 1. The sum signal 405 can be generated in particular when the controllable switches are switched synchronously with one another.

REFERENCE SYMBOL LIST 100 current switch control system
101-1 controllable switch
101-2 controllable switch
103-1 first current switching controller
103-2 second current switching controller
105-1 current reference value
105-2 current reference value
107-1 first current measuring device
107-2 second current measuring device
109-1 first current value
109-2 second current value
111 reference value controller
113 PID controller
115-1 PID controller
115-2 PID controller
117-1 first signal generator
117-2 second signal generator
119-1 current measuring resistor
119-2 current measuring resistor
121 control subsystem
123-1 first interleaved converter
123-2 second interleaved converter
125 voltage source
127 signal output
129 interleaved current factor correction circuit
200 comparison illustration
201 output signal
203 output signal
205 performance limit characteristic
301-1 inductance
301-2 inductance
303-1 diode
303-2 diode
303-3 diode
303-4 diode
303-5 diode
303-6 diode
305 capacitor
307 resistor
309 AC generator
400 signal display over time
401 sum signal
403-1 component signal
403-2 component signal
405 sum signal
407-1 component signal
407-2 component signal

The invention claimed is:

1. A current switch control system for switching time control of controllable switches, comprising:
a first controllable switch configured to operate in a first switched state and a second switched state;
a first current switching controller configured to switch control of the first controllable switch, the first current switching controller being configured to, based on a first current reference value and a first current measured value of a first current flow through the first controllable switch detected by a first current measuring device, generate a first pulse width modulated switching signal for controlling the first controllable switch, wherein the first controllable switch is configured to change from the first switched state to the second switched state in accordance with the first pulse-width-modulated switching signal;
a second controllable switch configured to operate in a third switched state and a fourth switched state;
a second current switching controller configured to switch control of the second controllable switch, the second current switching controller being configured to, based on a second current reference value and a second current measured value of a second current flow through the second controllable switch detected by a second current measuring device, generate a second pulse width modulated switching signal for controlling the second controllable switch, wherein the second controllable switch is configured to change from the third switched state to the fourth switched state in accordance with the second pulse-width-modulated switching signal; and
a reference value controller configured to, based on the first pulse-width-modulated switching signal and the second pulse-width-modulated switching signal, separately change the first current reference value for the first current switching controller and the second current reference value for the second current switching controller.

2. The current switch control system according to claim 1, wherein the first current switching controller comprises a first proportional-integral-derivative (PID) controller and is configured to subtract the first current measurement value from the first current reference value and to provide a difference value based on the subtraction as a first input signal to the first PID controller.

3. The current switch control system according to claim 2, wherein the first PID controller is configured to provide a first switching time control signal based on the first input signal.

4. The current switch control system according to claim 3, wherein the first current switching controller comprises a first signal generator which is configured to convert the first switching time control signal into the first pulse-width-modulated switching signal for controlling the first controllable current switch.

5. The current switch control system according to claim 1, wherein the second current switching controller comprises a second proportional-integral-derivative (PID) controller and is configured to subtract the second current measurement value from the second current reference value and to provide a difference value based on the subtraction as a second input signal to the second PID controller.

6. The current switch control system according to claim 5, wherein the second MD controller is configured to provide a second switching time control signal on the basis of the second input signal.

7. The current switch control system according to claim 6, wherein the second current switching controller comprises a second signal generator which is configured to convert the second switching time control signal into the second pulse-width-modulated switching signal for controlling the second controllable current switch.

8. The current switch control system according to claim 1, wherein the reference value controller is configured to generate a reference value control signal and to add the reference value control signal to the first current reference value or the second current reference signal or to subtract the reference value control signal from the second current reference value.

9. The current switch control system according to claim 1, wherein the reference value controller is configured to generate a difference value between the first pulse-width-modulated switching signal and the second pulse-width-modulated switching signal.

10. The current switch control system according to claim 9, wherein the reference value controller comprises a proportional-integral-derivative (PID) controller and is configured to provide the further ND controller with the difference value as an input signal, and wherein the PID controller is configured to generate the reference value control signal.

11. The current switch control system according to claim 1, wherein the first current measuring device is configured to detect the first current measured value of the first current flow through the first controllable switch using a first current measuring resistor, and the second current measuring device is configured to detect the second current measured value of the second current flow through the second controllable switch using a second current measuring resistor.

12. The current switch control system according to claim 1, wherein one or more of the first current switching controller, the second current switching controller, or the reference value controller is part of a digital signal processor (DSP) or at least partially implemented as a software program which can be executed by the digital signal processor.

13. The current switch control system according to claim 1, wherein the first controllable switch and the second controllable switch are arranged electrically in parallel to one another, and wherein a control subsystem comprising the first current switching controller the second current switching controller, and the reference value controller is configured to apply the first pulse-width-modulated switching signal to the first controllable switch and to apply the second pulse-width-modulated switching signal to the second controllable switch.

14. The current switch control system according to claim 13, wherein the control subsystem is configured to control one or more of: respective switching times of the controllable switches a current of a current sum, or a current frequency of the current sum, wherein the current sum comprises a sum signal of the first current flow through the first controllable switch and the second current flow through the second controllable switch.

15. The current switch control system according to claim 1, wherein the reference value controller is configured to compensate for a deviation of the first current measured value from an actual value of the first current flow through the first controllable switch or to compensate for a deviation of the second current measurement value from an actual value of the second current flow through the second controllable switch; based at least in part on a control of the current reference value to dampen high-frequency current oscillations with a frequency in the range of 20 kHz to 30 MHz.

16. The current switch control system according to claim 1, wherein the first pulse-width-modulated switching signal is phase-shifted by half a switching period with respect to the second pulse-width-modulated switching signal to compensate a sum of the first current flow through the first controllable switch and the second current flow through the second controllable switch against each other to a DC signal.

* * * * *